United States Patent Office 3,133,649
Patented May 19, 1964

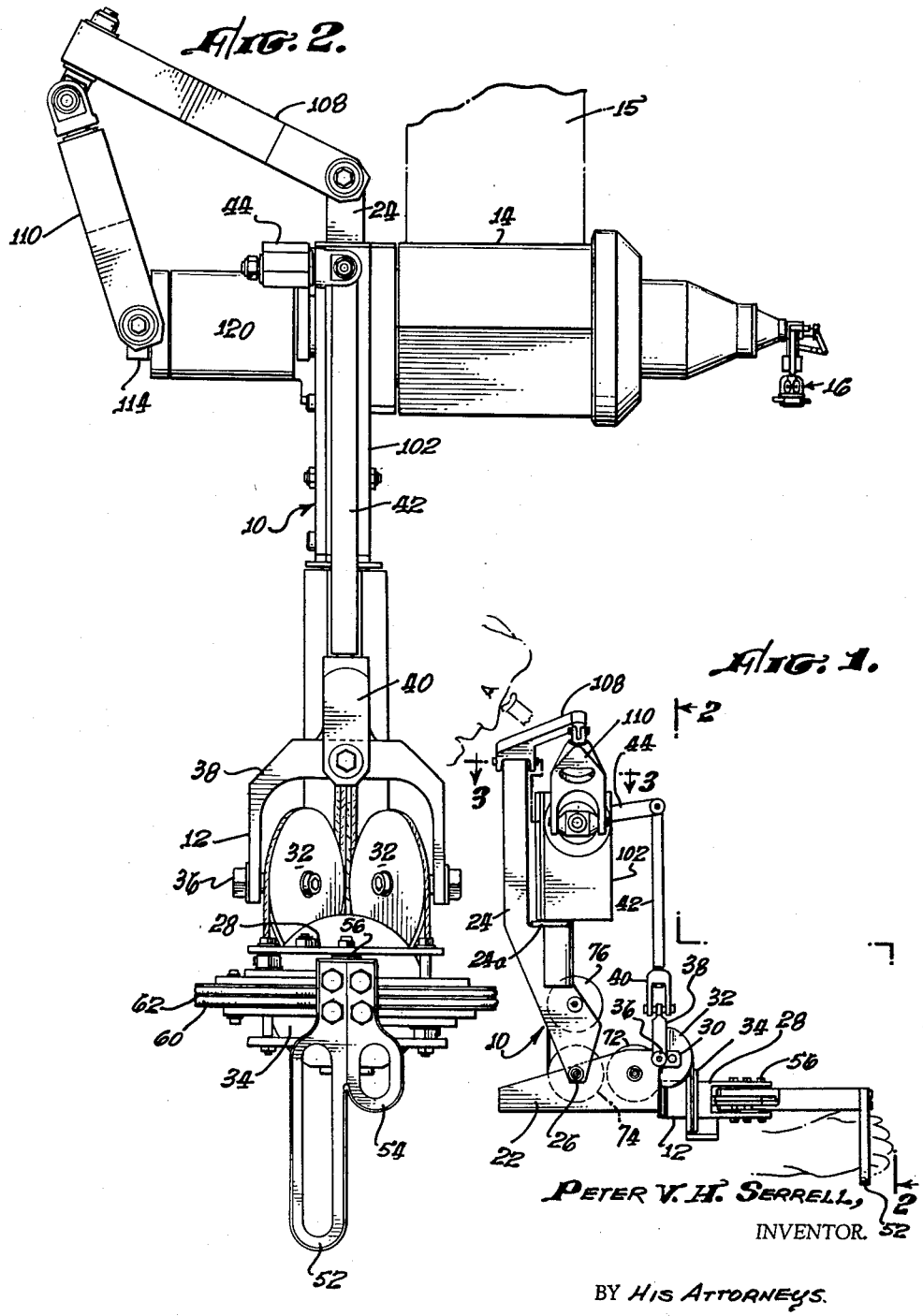

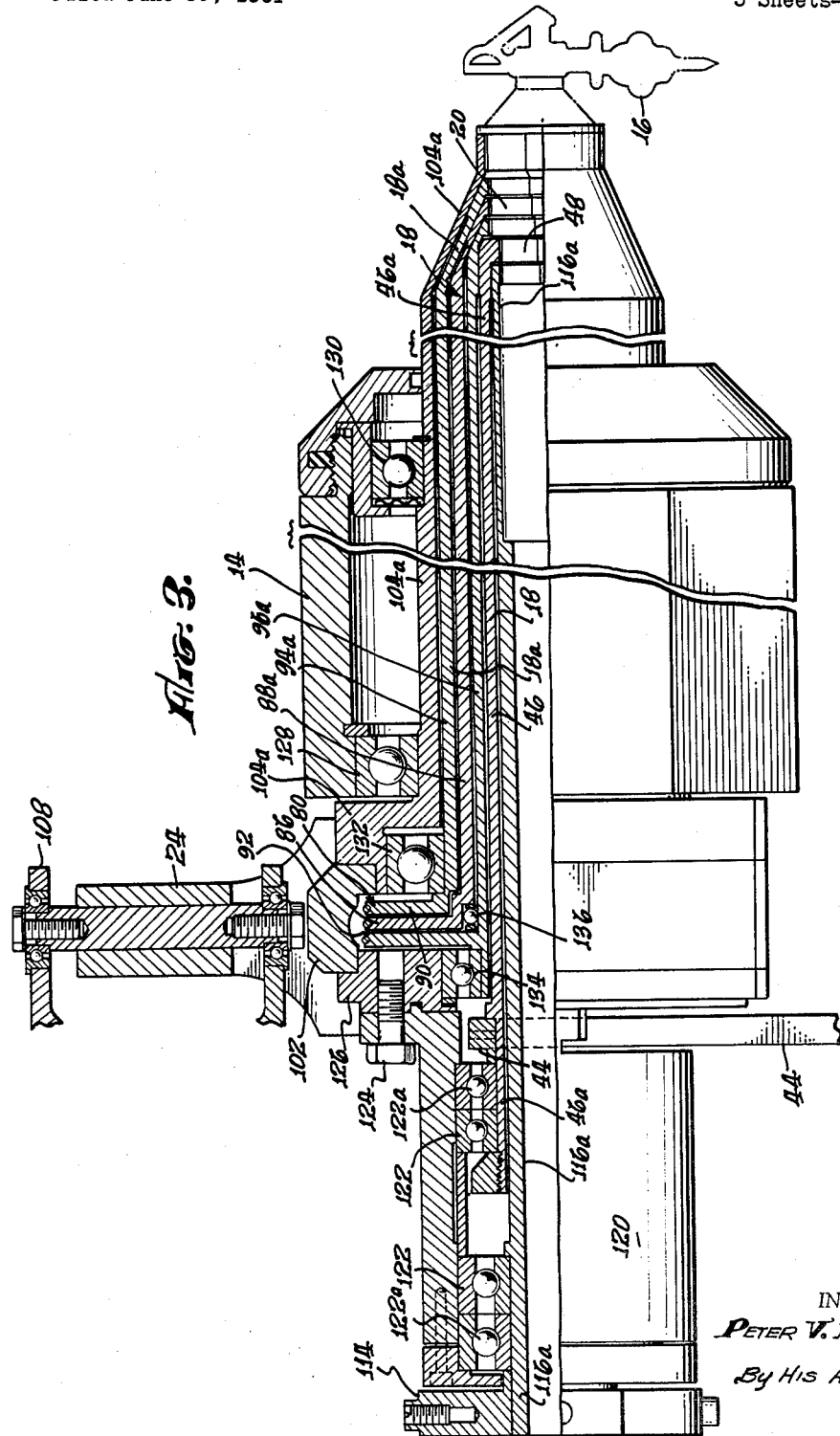

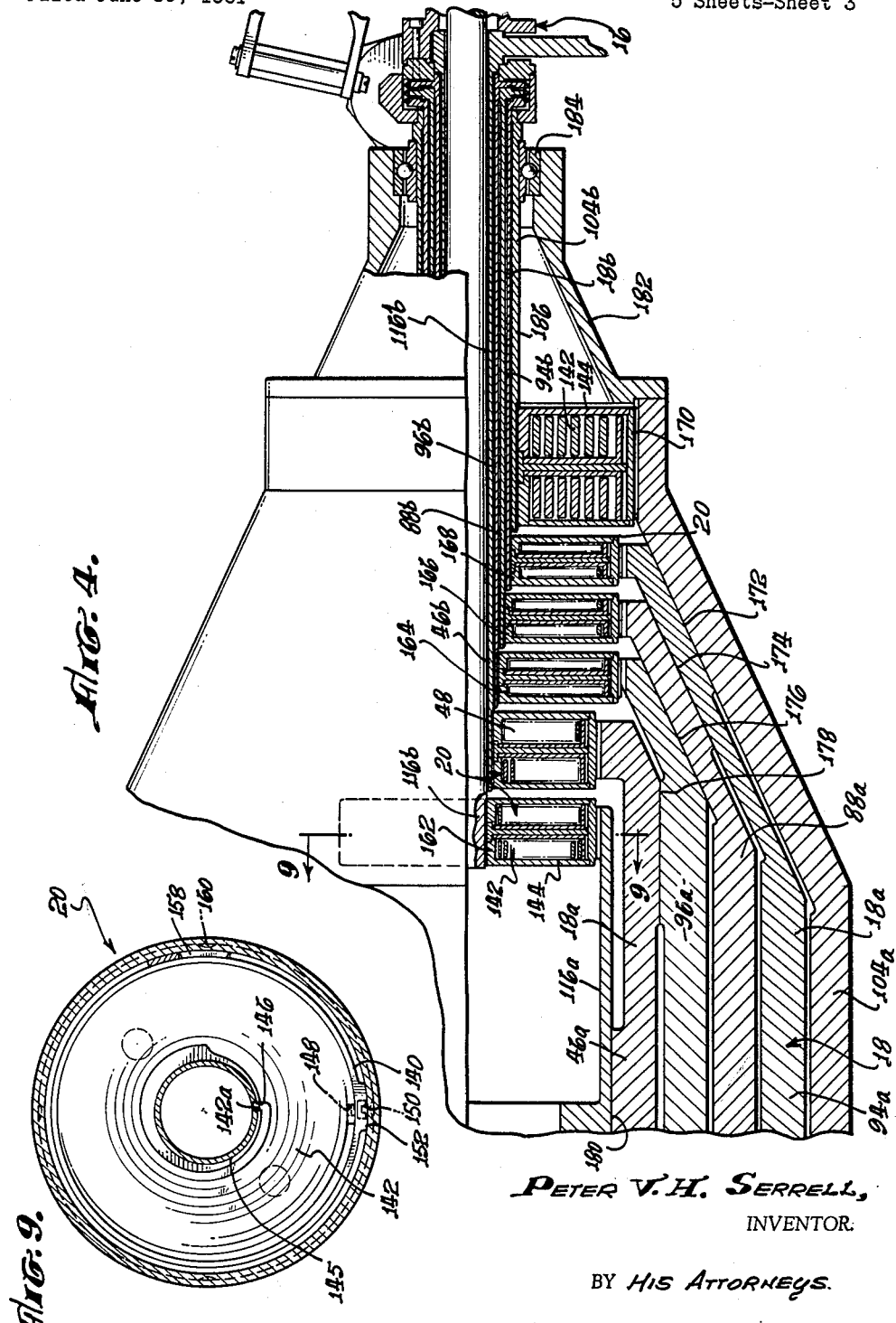

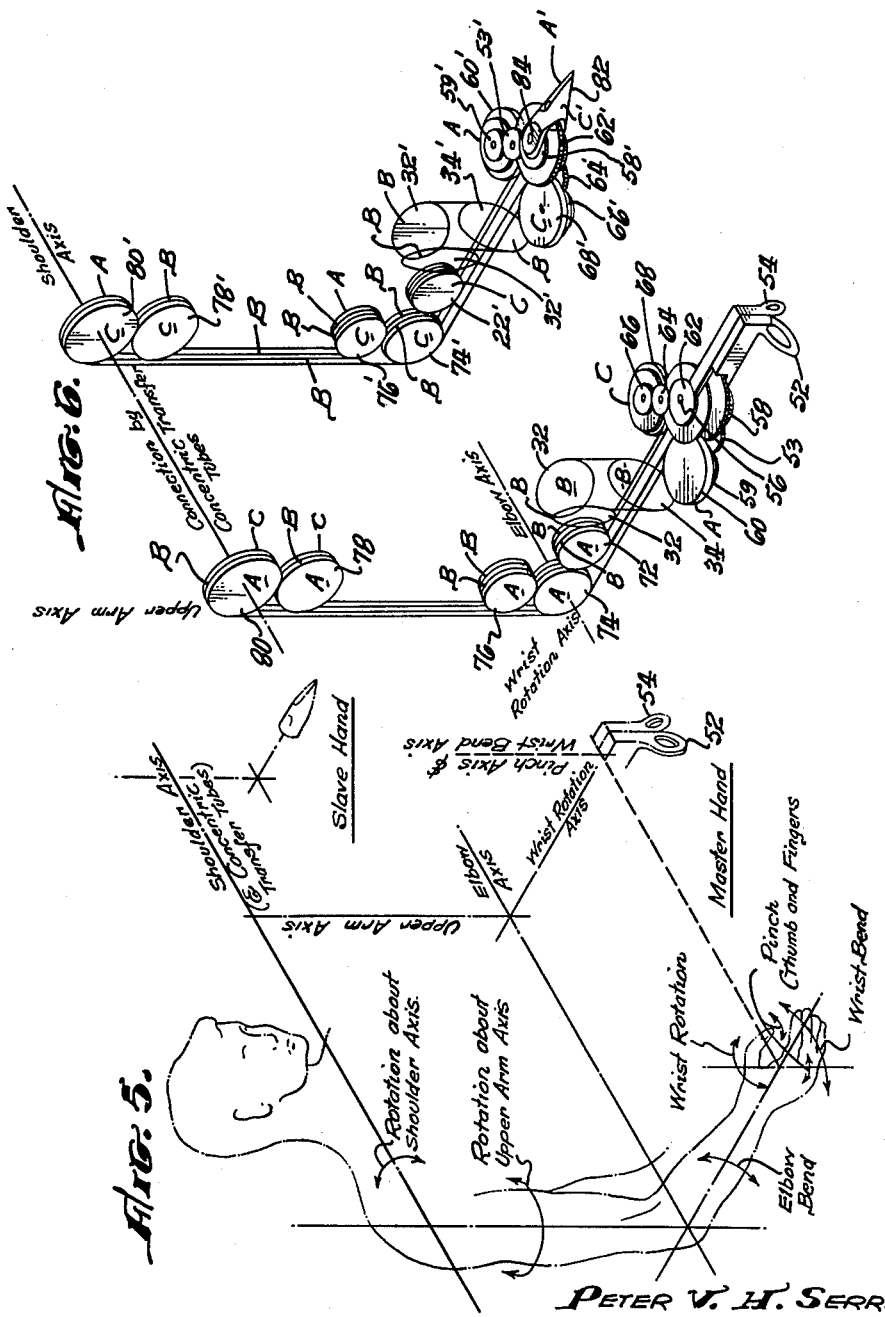

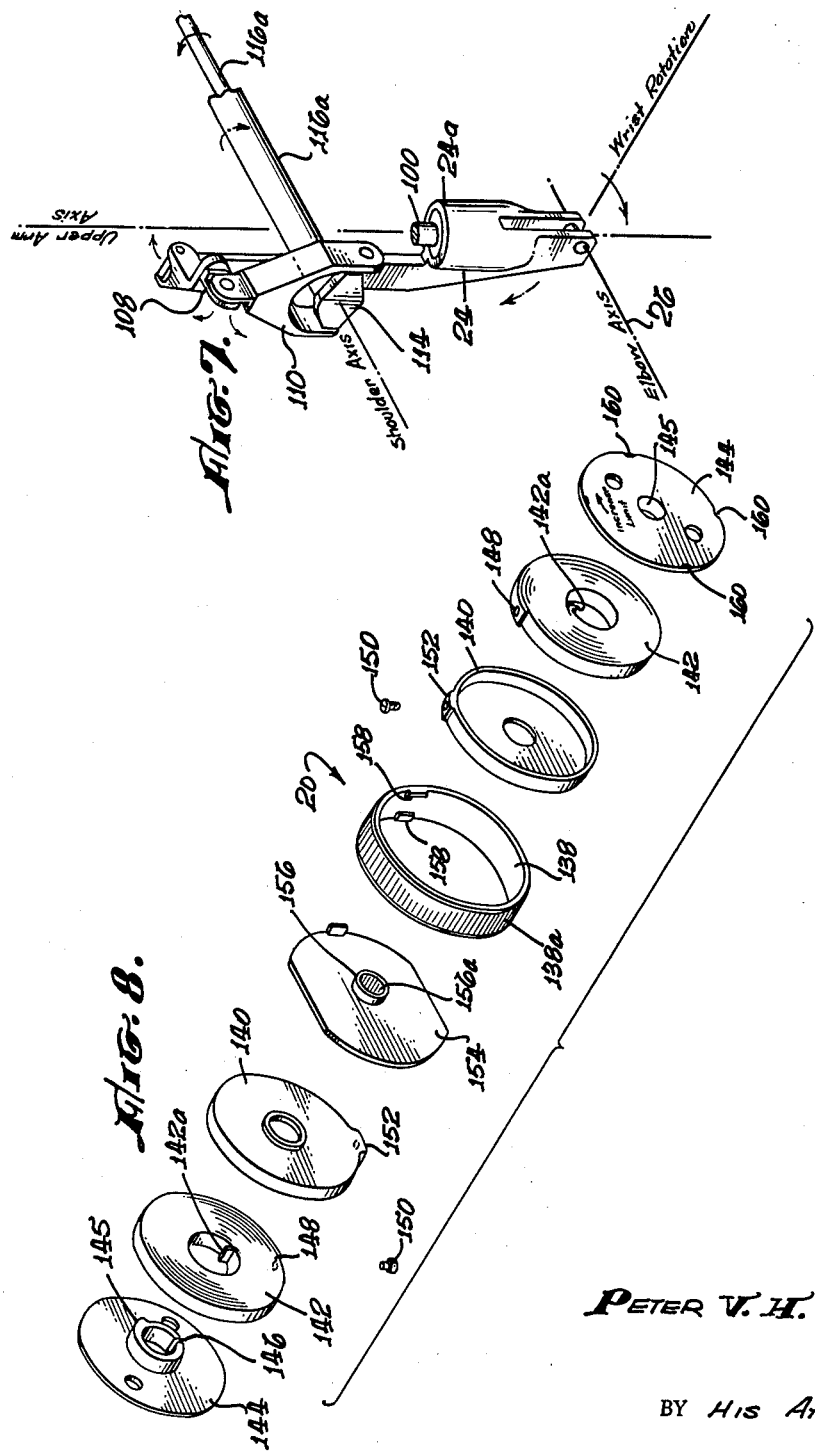

3,133,649
MOTION REDUCTION APPARATUS
Peter V. H. Serrell, Santa Monica, Calif., assignor to Micro Technology Laboratories, Inc., Los Angeles, Calif., a corporation of California
Filed June 30, 1961, Ser. No. 121,206
16 Claims. (Cl. 214—1)

This invention relates to a device for mechanical manipulation and more particularly pertains to an apparatus by which movements of an operator are reproduced on a smaller scale in a slave assembly which may include, for example, a claw which engages an article to be manipulated.

Motion reduction apparatus have been characterized by their clumsiness and have generally demanded extensive practice by an operator before the apparatus may be effectively employed. In conventional motion reduction apparatus, play in a macromechanism or master assembly is directly transferred in the same magnitude into a micromechanism or slave assembly. For example, a backlash of $\frac{1}{10}\%$ in the master assembly on transfer into the slave assembly appears therein a 1% backlash in an apparatus having a 10 to 1 reduction. The motion reduction apparatus of the invention minimizes transfer of backlash, as well as bearing play, into the motion of the slave assembly. The device of the invention is easily manipulated and provides movements which closely correspond to the movements of the operator's hand, facilitating the operator's manipulation of the device. The motion reduction apparatus of the invention is unusually compact because of its improved design and is capable of transmitting motions with minimum of introduced backlash and play.

The motion reduction apparatus of the invention is typical in having a master assembly linked to a slave assembly and is capable of transferring at least one motion from a lever system of the master assembly to a corresponding lever system of the slave assembly. The apparatus of the invention employs an elongated torque or transfer tube interconnecting the lever system of the master assembly to the corresponding lever system of the slave assembly. The torque tube of each lever system is characterized at its master assembly end by a significantly larger diameter than exists at the slave assembly end of the tube. Normally, there will be a plurality of lever systems of the master assembly interconnected through a like number of torque tubes to a corresponding number of slave lever systems. Each of the respective ends of the torque tube is journaled in a bearing support of the same general magnitude as the components of the assembly with which the respective end is associated. That is to say, the bearing supporting the end of the torque tube associated with the master assembly or macromechanism is of the same magnitude as the other bearings, levers, and components of the macromechanism itself. The opposite end of the torque tube, being, as mentioned, considerably reduced in diameter, is journaled in a relatively small bearing of the same order of magnitude as the bearings, levers and other components of the slave assembly or micromechanism. It will be appreciated that in the apparatus of the invention, the master portion of a torque tube may be divided into two lengths with the two lengths being spaced apart and interconnected through a suitable servo-system, selsyn system, and the like. The use of a servo-system or selsyn system will permit placement of the slave assembly at a distance remote from the master assembly.

The diameter of the torque tube at its master end is generally at least five times as large as the diameter of the tube at its slave end. Preferably, the torque tube at its slave end is approximately one tenth or less the diameter at the other end. In a preferred embodiment, the elongated torque tube is divided into a first section having a considerably larger diameter than a second section, and the two sections of the torque tube are preferably joined together through a torque limiter which in addition to coupling the two torque tube sections together serves to limit the amount of torque transferred from the first section of the torque tube to the second section of that tube.

The point of connection of the lever system of the slave assembly to the torque tube is desirably closely spaced to the bearing supporting the slave end of the tube. Because of the relatively short length of torque tube projecting beyond the bearing supporting the slave end of the tube and because of the relatively long length of the torque tube, the magnitude of play of the bearing or bearings supporting the tube at the master assembly end thereof is significantly reduced at the slave end.

In a preferred embodiment of the motion reduction apparatus of the invention, several torque tubes are concentrically disposed and provided in a number equal to the number of motions to be transferred. Each of the torque tubes is connected at its respective ends to a lever system of the master assembly and to a corresponding lever system of the slave. The arrangement of the several torque tubes into a concentric grouping minimizes space requirements and provides a compact motion reduction apparatus of vastly improved design. The improved torque tube mechanism of the invention for transmitting motion from the master assembly to the slave assembly may be advantageously employed with various motion reduction apparatus having differing types of micromechanisms and macromechanisms.

The foregoing objects, advantages, features and results of the present invention, together with various other objects, advantages, features and results thereof which will be evident to those skilled in the art in the light of this disclosure, may be attained with the exemplary embodiment of the invention described in detail hereinafter and illustrated in the accompanying drawings.

In the drawings:
FIG. 1 is a side view of a preferred embodiment of the motion reduction apparatus of the invention, illustrating an operator manipulating the apparatus and viewing the slave assembly of the device through a binocular microscope;

FIG. 2 is a front view of the motion reduction apparatus of the invention taken along line 2—2 of FIG. 1;

FIG. 3 is a fragmentary top view of the device of FIGS. 1 and 2, partly cut away, illustrating several torque tubes which link the master assembly to the slave assembly which latter assembly is shown in phantom lines;

FIG. 4 is an enlarged, fragmentary top view, illustrating in detail the bearing support for the slave end of the several, concentrically-disposed torque tubes of FIG. 3 and also illustrating several torque limiters which respectively interconnect a first section and a second section of the several torque tubes;

FIG. 5 is a diagrammatic representation of the general arrangement of axes and motions transmittable between the master assembly and slave assembly of the device of the invention;

FIG. 6 is a schematic representation of the several cable runs of the master and slave assemblies of the device of the invention, it being seen that the several cable runs of the master assembly are reproduced in the slave assembly with the concentric torque or transfer tubes providing the linkage between the two assemblies, FIG. 7 is a diagrammatic representation of the linkages of the device of the invention responsible for rotation about upper arm and shoulder axes;

FIG. 8 is an exploded view of the several component parts of a typical torque limiter suitable for interconnecting the two sections of a torque tube of the device of the invention; and FIG. 9 is a sectional view taken along line 9—9 of FIG. 4 to illustrate further the details of the structure of a typical torque limiter.

With reference to FIGS. 1 and 2, the motion reduction apparatus 10 of the invention comprises a macromechanism or master assembly 12 interconnected through a mounting housing 14 which contains several concentrically disposed, torque or transfer tubes indicated generally by numeral 18 (FIG. 3) and hereinafter described to a micromechanism or slave assembly 16. As diagrammatically illustrated in FIG. 5, the particular embodiment of the motion reduction apparatus of the invention illustrated is capable of transmitting six particular motions from the master assembly or hand to the slave assembly or hand, these motions being namely: (1) rotation about shoulder axis, (2) upper arm rotation, (3) elbow bend, (4) wrist rotation, (5) combined wrist bend and pinch of thumb and fingers and (6) independent motion of thumb and fingers.

Motions introduced into the master assembly 12 through manipulations of the operator are transmitted through the several concentric torque tubes 18 contained within the mounting housing 14 to the slave assembly 16 illustrated in phantom lines in FIG. 3. As best seen in FIGS. 3 and 4, each of the several torque tubes 18 is formed of a first section 18a which is interconnected through a torque limiter 20 to a second torque tube section 18b. The two sections 18a and 18b of a torque tube 18 will be commonly referred to hereinafter as transfer tubes. For a better understanding of the relationship of the two transfer tubes 18a and 18b of a torque tube 18, reference should be made to both FIGS. 3 and 4. The several torque limiters 20, which are of conventional design, are illustrated in a preferred form in FIG. 8. The mounting housing 14 which contains the aforementioned concentrically disposed torque tubes 18 provides the means for mounting the motion reduction apparatus 10. The mounting housing 14 may be conveniently provided in the form of a hexagonal shell to which suitable clamps may be secured and the clamps in turn held to an overhead suspension 15 (see FIG. 2) or mounted on a suitable pedestal. The master assembly 12 and the slave assembly 16 are unaffixed and completely free to move about the mounting housing 14 in response to the manipulations of the operator.

The master assembly 12 is comprised of several major component parts including a generally horizontally disposed forearm member 22 (FIG. 1) which is pivotally held to the lower end of a generally perpendicular upper arm housing 24 about a horizontal elbow axis, along which axis there is placed a shaft 26. The forearm member 22 at its forward end carries a rotatably mounted control member 28. The control member rotates about a generally horizontally disposed wrist rotation axis. It will be understood that the wrist rotation axis may be manipulated away from its generally horizontal orientation. The forearm member 22 at its forward end carries two forwardly extending and outwardly flared ears 30, each of which ears 30 rotatably supports a sheave 32. The aforementioned control member 28 adjacent the forearm member 22 is provided with an integrally formed pulley 34 (see FIGS. 1, 2 and 6).

The upper forepart of the forearm member 22 adjacent the ears 30 is rotatably held by a pin 36 to a wrist clevis 38. The wrist clevis 38 in turn is rotatably held to a bicep clevis 40, about an axis perpendicular to the pin 36. The bicep clevis 40 threadedly engages the lower end of a bicep strut 42. The upper end of the bicep strut 42 is pivotally held to an arm 44, which arm, as seen in FIG. 3, at its other end is pinned to a cylindrical transfer tube 46a.

The transfer tube 46a is the second innermost of the several torque tubes 18. The transfer tube 46a is coupled through a torque limiter 48 to a transfer tube 46b (see FIG. 4). Transfer tube 46b has approximately one tenth the diameter of its larger associated transfer tube 46a. The transfer tube 46b is the second innermost of several small concentrically disposed torque tubes found at the right of FIG. 4 interconnecting with the linkages of the slave assembly 16. It will now be apparent that each of the several torque tubes 18 comprises a first transfer tube 18a of relatively large diameter coupled through a torque limiter 20 to a corresponding smaller diameter transfer tube 18b. Each of the several motions transmitted from the master assembly 12 to the slave assembly 16 has a torque tube 18 formed of two sections or transfer tubes 18a and 18b, coupled through a suitable torque limiter. The aforementioned transfer tubes 46a and 46b cooperate to transfer the elbow bend motion of the operator. The operator in bending his elbow pivots the control member 28 and forearm member 22 about the shaft 26 which constitutes the elbow axis. With the pivoting of the apparatus about the shaft 26, it will be seen that the bicep strut 42 moves up and down imparting motion to the arm 44 that is affixed or pinned to the elbow bend transfer tube 46a. As earlier described, the transfer tube 46a transmits motion through the torque limiter 48 to the transfer tube 46b of the slave assembly. The slave assembly in a motion reduction apparatus such as that described herein is essentially the full counterpart of the master assembly but on a reduced scale, being provided with similar components.

With reference to FIG. 5, it will be seen that independent motion of thumb and fingers can be combined to provide wrist bend and pinch motion about a generally vertical axis, with the master assembly 12 in its general normal position illustrated in FIGS. 1 and 2. The pinch motion is created by manipulation of one or other or both of a finger grip member 52 and a thumb grip member 54, which two members are pivotally held together by a shaft 56 (FIG. 6) lying along the wrist bend and pinch axis. Actuation of the finger grip member 52 transmits motion through a driving gear 58 to an idler gear 53 which engages in turn a driven gear 59 affixed to a common shaft with a pulley 60. The pulley 60 engages with a cable. In a similar fashion the movement of the thumb grip member 54 rotates a driving gear 62, an idler gear 64 which engages a driven gear 66 that is mounted on a common shaft with a pulley 68. The pulley runs for transmitting the respective motions of the finger grip member 52 and thumb grip member 54 are indicated in FIG. 6 by the letters A and C. It will be noted that the respective pulleys or sheaves marked A and C respectively occupy the outside positions of each of the several pulley or sheave groupings. Again referring to FIG. 6 and also FIGS. 1 and 2, it will be readily seen that the rotation motion created with the rotation of pulley 34 is transmitted through the two angularly located sheaves 32 to the cooperating two inner pulleys of each of three groupings of lower pulleys 72, 74 and 76 (the individual pulleys of the groupings are indicated by single lines). The cable run for the wrist rotation motion is indicated in FIG. 6 by the legend B. The three lower pulley groupings 72, 74 and 76 each comprise four pulleys or sheaves mounted on a common shaft within each instance outer pulleys transmitting thumb and finger motions respectively and with the two inner pulleys transmitting wrist rotation. Upper two pulley groupings 78 and 80 (see FIG. 6) each contain three pulleys with the inner pulley or sheave transmitting wrist rotation and the outer two, thumb and finger motion respectively. It will be appraciated that the pulleys or sheaves occupying the grouping 80 are affixed to or integrally formed with certain ones of the torque tubes 18. As best seen in the schematic of FIG. 6 the slave assembly 16 has essentially the same cable runs and pulleys as described in the master assembly. Similar numbers and letters (provided with prime symbols) have been given to corresponding pulleys and cables of the slave assembly as used in the description and illustration of the master assembly. The cables and pulleys marked A and C of the slave assembly terminate in a claw 82 comprising two members A' and C' that are pivotally held together about a common shaft 84. As is apparent, manipulation of the cable runs A and C results in movement of the parts A' and C' of the claw 82.

Each of the three pulleys or sheaves making up the upper pulley grouping 80 of FIG. 6 (as best seen in FIG. 3) is an integral part of its respective torque tube 18. Sheave 86 which is the middle sheave of the top grouping 80 transmits wrist rotation motion to a wrist rotation transfer tube 88a. Sheaves 90 and 92, the outside two pulleys of the upper grouping 80, respectively transfer finger grip motion and thumb grip motion to a finger motion transfer tube 94a and a thumb motion transfer tube 96a, respectively.

The elongated upper arm housing 24 (see FIGS. 1 and 7) midway of its length has a housing which engages the outer races of a pair of ball bearings which in turn receive and rotatably hold an elongated, cylindrical pivot member 100 which extends downwardly from a shoulder housing 102. The shoulder housing 102, as seen in FIG. 3, is bolted into engagement with a shoulder rotation transfer tube 104a which is the outermost of the several transfer tubes.

The upper arm housing 24, through which upper arm motion is transmitted, is at its upper end connected to a torque arm 108. The torque arm 108 (see FIG. 2) connects in turn to an A-frame 110, the legs of which straddle and are bolted to a torque hub 114. The torque hub 114 is press fitted to the outer end of an upper arm rotation transfer tube 116a. Reference to FIG. 3 will show that transfer tube 116a is the innermost of the several, concentrically disposed, torque tubes 18. The outer end of the upper arm rotation transfer tube 116a is housed within an end bell housing 120 and is rotatably held within the housing by several bearings 122 which take the form of annular races containing ball bearings 122a. The end bell housing 120 is held by bolts 124 to a cover 126 that in turn is fixed to the shoulder housing 102.

The outermost of the several torque tubes 18, i.e., the shoulder rotation transfer tube 104a, is rotatably held within the outer mounting housing 14 by spaced bearings 128 and 130. A bearing 132 is disposed between the two transfer tubes 104a and 94a. Bearing 134 separates the cover 126 from the thumb motion transfer tube 96a. A bearing 136 is disposed between the aforementioned thumb motion transfer tube 96a and the next, outlying transfer tube 88a (the wrist rotation transfer tube).

As earlier mentioned each torque tube 18 comprises a first section 18a and a second section 18b, the first section having a diameter several times, usually at least 10 times, as great as the second section 18b. It will be noted, with reference to FIG. 4, that the larger sections of each of the several transfer tubes such as transfer tubes 94a, 104a, 88a, 96a, 46a and 116a have their respective outwardly-lying smaller second sections identified as 94b, 104b, 88b, 96b, 46b and 116b. The two sections of each of the transfer tubes are connected through a suitable torque limiter 20 which may be of conventional design.

A typical torque limiter 20 is illustrated in the exploded view of FIG. 8 and in FIG. 9 where it is seen that the limiter comprises an outer housing 138 which is provided with serrations 138a around its outside perimeter, and two inner housings 140. Each of the two inner housings 140 houses a spring 142 and a closure 144. Each closure has an inwardly extending boss 145 which boss carries a groove 146 that engages the inner end 142a of the spring 142. The outer end 148 of the spring 142 is fixed to the inner housing 140 by a screw 150. The screw 150 is contained within a peripheral projection 152. A driven disc 154 is floatably contained within the outer housing between the two assembled inner housings 140. The driven disc 154 has a boss 156 extending axially from its two sides. The boss 156 carries internal serrations 156a which engage the outside diameter of a second section 18b of the appropriate torque tube 18 extending therethrough. The serrations 138a found on the outside perimeter of the outer housing 138 engage the inside diameter of a first section 18a of the approprate torque tube 18. It will be noted that the two spiral springs 142 contained within each torque limiter are oppositely wound. As seen in FIG. 8, the outer housing 138 carries two inwardly extending lugs 158 near each of its outside edges. Each lug 158 will engage the peripheral projection 152 of one of the inner housings 140 in the assembled torque limiter. The tension of the springs is adjusted in this fashion. A spanner is inserted in appropriate holes provided in the end of each closure 144 and rotated in the direction of the arrow until the desired torque value is applied to the driven disc 154. When this value is reached the peripheral edge of the outer housing 138 is staked into notches 160 provided in the respective end closures 144. The several torque limiters 162, 48, 164, 166, 168 and 170 limit the amount of torque that may be transmitted from the larger first section 18a of each torque tube 18 to its corresponding second section 18b. The torque limiters in addition serve to return the motion reduction apparatus to its neutral position with the release by the operator.

It will be noted that the several first sections 18a of the torque tubes 18 at their outer ends, adjacent the several torque limiters 20, slidably support each other by bearing surfaces 172, 174, 176, 178 and 180. The outer ends of the second sections 18b of the several torque tubes 18 slidably support each other in a similar fashion as seen in FIG. 4. The transfer tube 104b which is the outermost of the several concentric transfer tubes contained within the slave assembly 16 is supported within a conical housing 182 by a suitable ball bearing 184.

Although an exemplary embodiment of the invention has been disclosed herein for purposes of illustration, it will be understood that various changes, modifications, and substitutions may be incorporated in such embodiment without departing from the spirit of the invention as defined by the claims which follow.

I claim:

1. In a motion reduction apparatus having a master assembly of several components linked to a slave assembly of several components with at least one motion being transferred from a lever system of the master assembly to a corresponding lever system of the slave assembly, the improvement comprising:

an elongated torque tube interconnecting said two lever systems and having a first section and a second section of differing diameters, said first section of the torque tube having a significantly larger diameter than the second section and being connected to said lever system of the master assembly, the second section of the torque tube being connected to the lever system of the slave assembly, said torque tube being journaled adjacent each of its respective ends in a bearing of the same magnitude as the components of the assembly with which the respective end is associated; and a torque limiter placed between the two sections of the torque tube and serving to interconnect said two sections and to limit the torque transferred from the first section to the second section of said torque tube.

2. A motion reduction apparatus in accordance with claim 1 wherein the diameter of the first section of the torque tube is at least five times the diameter of the second section of the torque tube.

3. A motion reduction apparatus in accordance with claim 1, wherein the point of connection of the slave lever system to the second torque tube section is closely spaced to the bearing supporting said second torque tube section.

4. In a motion reduction apparatus having a master assembly of several components linked to a slave assembly of several components with several motions being separately transferred from lever systems of the master assembly to corresponding lever systems of the slave assembly, the improvement comprising:
several, concentrically-disposed, elongated torque tubes of differing diameters equaling in number the number of motions to be transferred, connected at their respective ends to lever systems of the master assembly and to corresponding lever systems of the slave assembly, each of said torque tubes having a first, larger diameter section and a second, smaller diameter section with the first section connected to the lever system of the master assembly and with the second section connected to the lever system of the slave assembly;
bearings supporting opposite ends of the respective tubes, each of said bearings being of the same magnitude as the components of the assembly with which it is associated; and
a torque limiter placed between the two sections of each torque tube and serving to interconnect said two sections and to limit the torque transferred from the first section to the second section of said torque tube.

5. A motion reduction apparatus comprising:
a master assembly including a lever system of several components;
a slave assembly including a lever system of several components;
an elongated torque tube interconnecting said lever system of the master assembly to the lever system of the slave assembly with the diameter of said torque tube at its master assembly end being significantly larger than at its slave assembly end;
a bearing supporting the master assembly end of the torque tube, said bearing being of the same magnitude as the components of the lever system of the master assembly; and
a bearing supporting the slave assembly end of the torque tube, said bearing being of the same magnitude as the components of the lever system of said slave assembly.

6. A motion reduction apparatus in accordance with claim 5 wherein the diameter of the torque tube at its master assembly end is at least five times its diameter at its slave end.

7. A motion reduction apparatus comprising:
a master assembly including a lever system of several components;
a slave assembly including a lever system of several components;
an elongated torque tube interconnecting said two lever systems and having a first section and a second section of differing diameters, said first section of the torque tube having a significantly larger diameter than the second section and being connected to said lever system of the master assembly with the second section of the torque tube being connected to the lever system of the slave assembly;
a bearing supporting the torque tube at its master assembly end, said bearing being of the same magnitude as the components of the master assembly system; and
a bearing supporting the slave assembly end of the torque tube, said bearing being of the same magnitude as the components of the lever system of the slave assembly.

8. A motion reduction apparatus in accordance with claim 7 wherein a torque limiter is placed between the two sections of the torque tube, said torque limiter serving to interconnect said two sections and to limit the torque transfer from the first section to the second section of said torque tube.

9. A motion reduction apparatus in accordance with claim 7 wherein the diameter of the first section of the torque tube is at least five times the diameter of the second section of the torque tube.

10. A motion reduction apparatus in accordance with claim 7 wherein the point of connection of the slave assembly lever system to the second section of the torque tube is closely spaced to the bearing supporting said second torque tube section.

11. A motion reduction apparatus comprising:
a master assembly including lever systems of several components;
a slave assembly including lever systems of several components;
several concentrically-disposed, elongated torque tubes of differing diameters equaling in number the number of motions to be transferred, connected at their respective ends to lever systems of the master assembly and to corresponding lever systems of the slave assembly, each of said torque tubes having a significantly larger diameter at its master assembly end than at its slave assembly end;
bearings supporting the master assembly ends of the torque tubes, said bearings being of the same magnitude as the components of the lever systems of the master assembly with which they are respectively associated; and
bearings supporting the slave assembly ends of the torque tubes, said bearings being of the same magnitude as the components of the lever systems of said slave assembly with which they are respectively associated.

12. A motion reduction apparatus in accordance with claim 11 wherein the diameters of the respective torque tubes at their master assembly ends are at least five times their diameters at the slave ends.

13. A motion reduction apparatus comprising:
a master assembly including lever systems of several components;
a slave assembly including lever systems of several components;
several concentrically-disposed, elongated torque tubes of differing diameters equaling in number the number of motions to be transferred, connected at their respective ends to lever systems of the master assembly and to corresponding lever systems of the slave assembly, each of said torque tubes having a first larger diameter section and a second smaller diameter section with the first section connected to a lever system of the master assembly and with the second section connected to a lever system of the slave assembly;
bearings supporting the master assembly ends of the torque tubes, said bearings being of the same magnitude as the components of the lever systems of the master assembly with which they are respectively associated; and
bearings supporting the slave assembly ends of the torque tubes, said bearings being of the same magnitude as the components of the lever systems of the slave assembly with which they are respectively associated.

14. A motion reduction apparatus in accordance with claim 13 wherein the diameter of each of the torque tubes at its master assembly end is at least five times its diameter at its slave assembly end.

15. A motion reduction apparatus in accordance with claim 13 wherein the points of connection of the slave lever systems to the respective second sections of the torque tubes are closely spaced to the bearings supporting said second sections of the torque tubes.

16. A motion reduction apparatus comprising:
a master assembly including a lever system of several components;

a slave assembly including a lever system of several components;

an elongated torque tube interconnecting said two lever systems and having a first section and a second section of differing diameters, said first section of the torque tube having a significantly larger diameter than the second section and being connected to said lever system of the master assembly with the second section of the torque tube being connected to the lever system of the slave assembly; and a torque limiter placed between the two sections of the torque tube, said torque limiter serving to interconnect the two sections and to limit the torque transfer from the first section to the second section of the torque tube.

References Cited in the file of this patent

UNITED STATES PATENTS

| | | |
|---|---|---|
| 2,825,245 | Hobbs | Mar. 4, 1958 |
| 2,959,301 | Willsea | Nov. 8, 1960 |